July 2, 1968  J. E. PHILAPY  3,390,896
TRAILER HITCH

Filed May 13, 1966  2 Sheets-Sheet 1

INVENTOR.
JAMES E. PHILAPY
BY
Woodard, Weikart, Emhardt & Naughton
Attorneys

July 2, 1968  J. E. PHILAPY  3,390,896
TRAILER HITCH

Filed May 13, 1966  2 Sheets-Sheet 2

INVENTOR.
JAMES E. PHILAPY
BY
Woodard, Weikart, Emhardt & Naughton
Attorneys

United States Patent Office 3,390,896
Patented July 2, 1968

3,390,896
TRAILER HITCH
James E. Philapy, 1510 Kingston Road,
Kokomo, Ind. 46901
Filed May 13, 1966, Ser. No. 549,898
3 Claims. (Cl. 280—423)

ABSTRACT OF THE DISCLOSURE

A trailer hitch having a first element including a base adapted to be removably attached to the bed of a power vehicle to support a ball, and a ball socket carried on the end of a support element affixed to a trailer.

---

There are a number of prior art couplers which satisfactorily provide a means for coupling a four-wheel trailer with the wheels near each end or two-wheel trailers with the wheels near the center. However, there has been a long standing problem regarding the efficient, effective and safe coupling of a relatively large two-wheel trailer to a light power vehicle such as a light pickup truck or an automobile wherein the wheels are near the distal end of the trailer. When a relatively light vehicle has been coupled with a two-wheel trailer according to the teachings of the prior art, the trailers have been relatively unwieldly and unstable, lacked maneuverability and roadability, and have, in many cases, been dangerous.

One reason for the failure of the prior art couplers has been the very nature of the couplers. Ordinary trailer hitches are inefficient, slow to couple and uncouple, and often permit the trailer considerable independent movement, which is dangerous. Other prior art couplings have required considerable alteration of the truck. The necessary alterations are so extensive that the trucks could not be used as a pickup truck thereafter without a complete reconversion. As a result, semitrailers and the like have been confined to use in heavy trucking.

The present invention provides a coupling unit that can easily be applied to a pickup truck, as well as to other types of light trucks and automobiles, to enable their use as a prime mover of relatively large, two-wheel trailers, and wherein the coupling unit can be removed from the vehicle in a matter of minutes to reconvert it to its original use.

Therefore, it is a primary object of the present invention to provide an improved coupling unit for joining a trailer to a power vehicle.

It is an object of the present invention to provide a quickly attached and quickly detached coupling for joining a semitrailer to a light truck or an automobile.

It is an object of the present invention to provide a ball-hitch coupling for joining a two-wheel trailer to a relatively light vehicle wherein the units can be rapidly coupled or uncoupled by an unassisted driver.

It is a further object of the present invention to provide a coupling unit which improves the maneuverability and roadability of the trailer, and therefore provides a safer means for adapting a relatively light vehicle to pull a two-wheel trailer.

The full nature of the invention will be understood from the accompanying drawings and the following description and claims.

These and other objects will become apparent as the description proceeds with reference to the accompanying drawings in which.

Figure 1:
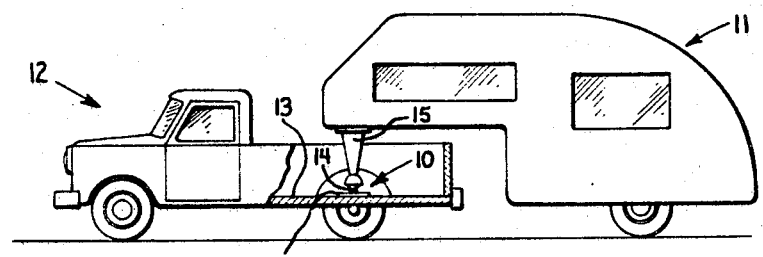
FIG. 1 is a side elevation of a pickup truck and two wheel trailer coupled according to the present invention with a portion of the truck broken away to show one embodiment of the coupling unit.

For the purpose of promoting an understanding of the principles of the invention, reference will now be made to the embodiments illustrated in the drawings and specific language will be used to describe the same. It will nevertheless be understand that no limitation of scope of the invention is thereby intended, such alterations and further modifications in the illustrated device, and such further applications of the principles of the invention as illustrated therein being contemplated as would normally occur to one skilled in the art to which the invention relates.

Figure 5:
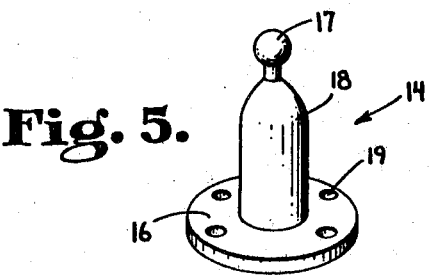
FIG. 5 is an enlarged perspective view of the male coupler of the embodiment of the present invention shown in FIG. 1.

Referring to the drawings, one embodiment of the present invention is illustrated in FIGS. 1 and 5. The coupling unit 10 for hitching a two-wheel trailer 11 to a power vehicle 12 having a load carrying bed 13 is illustrated in FIG. 1. The coupling unit 10 has a first coupling element 14 secured to the vehicle bed above the rear axle (not shown) of the vehicle 12 and a second coupling element 15 secured to the trailer 11.

As shown in FIG. 5, the first coupling element 14 has a circular base plate 16 adapted to be easily secured to and removed from the vehicle bed by aligning the apertures 19 of the base plate 16 with corresponding apertures in the vehicle bed and bolting the base plate thereto. Thus a pick-up truck or the like may be easily adapted to haul a relatively heavy two-wheel trailer without considerable alteration of the truck.

The ball 17 of a ball socket hitch is carried by a substantially cylindrical support column 18 which is coupled at a first end to the base plate 16 and extends upwardly therefrom. The ball is coupled to the free end of the column.

Figure 4:
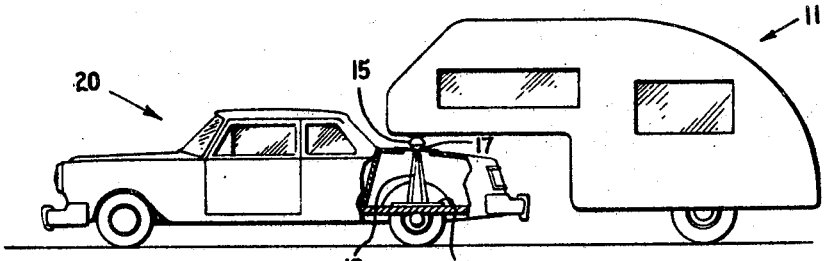
FIG. 4 is a side elevation of a coupled automobile and a trailer with a portion of the automobile broken away to show an embodiment of the present invention.

The height of the column may be varied according to the particular vehicle and trailer. In FIG. 1, element 14 has a short support column 18 and element 15 has a long column. However, when the present invention is used with an automobile 20, as shown in FIG. 4, the support column 21 of the element 14 is long and the support column of element 15 is short.

Figure 2:
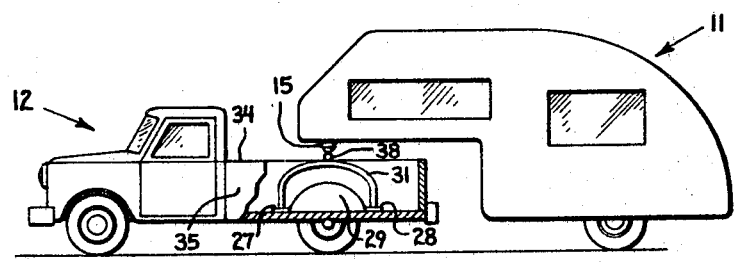
FIG. 2 is a side elevation as in FIG. 1 wherein a portion of the truck is broken away to show another embodiment of the coupling unit.
Figure 7:
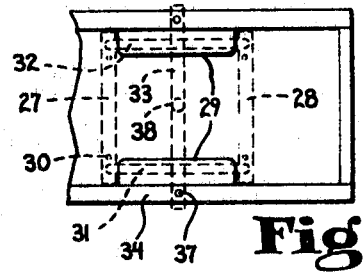
FIG. 7 is a top plan view of the embodiment of FIG. 6 installed in a pickup truck with fragmented lines illustrating the embodiment shown in FIG. 6.
Figure 6:
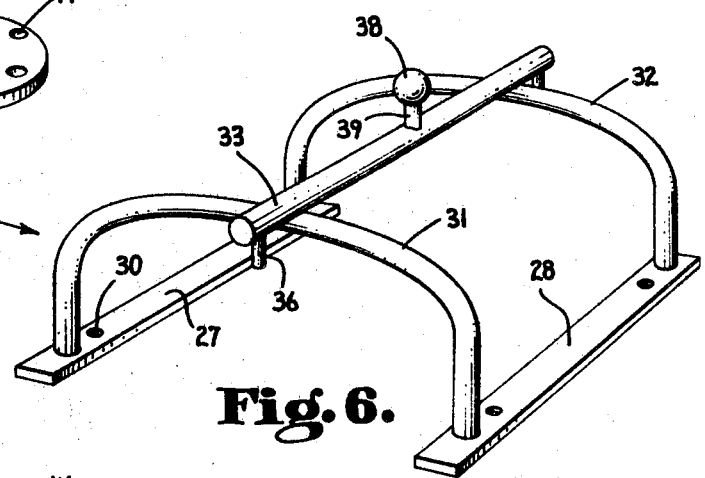
FIG. 6 is an enlarged perspective view of the male coupler of the embodiment shown in FIG. 2.

FIGS. 2, 6 and 7 illustrate a further embodiment of the present invention. The first element 26 of coupling unit 25 is adapted to be usable with a vehicle 12 such as a pick-up truck. Element 26 includes a pair of parallel bars 27 and 28 spaced to straddle the wheel wells 29 and be secured to the bed of the truck by aligning the apertures 30 with the apertures in the bed of the truck and bolting or otherwise securing the bars thereto. The bars 27 and 28 are spaced by first and second substantially C-shaped spacer members 31 and 32 respectively. The free ends of the spacer members are secured to bars 27 and 28 as shown in FIG. 6. Rod 33 is secured to spacer member 31 adjacent one end of said rod and to spacer member 32 adjacent the other end of said rod. Rod 33 is positioned mdiway between the bars 27 and 28 as is parallel thereto. The free ends of the rod 33 extend beyond spacer members 31 and 32.

When element 26 is in place, as shown by the dotted lines in FIG. 7 and in FIG. 2, the free ends of rod 33 rests on top 34 of the sidewall 35 of the vehicle bed and is secured thereto by integrally formed pegs 36 which interfit with apertures 37 in said top 34. The ball 38 is supported on and secured to a central portion of rod 33 by a stem 39.

Figure 3:
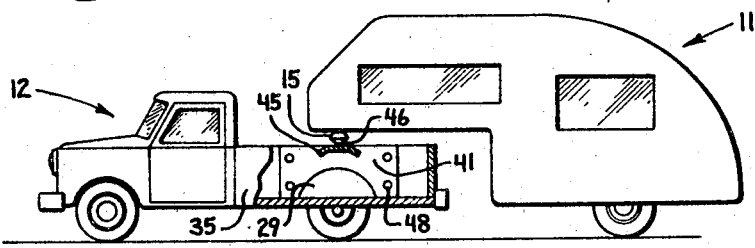
FIG. 3 is a side elevation of the truck and trailer coupled according to the present invention, with a portion of the truck broken away to show a third embodiment of the present invention.
Figure 8:
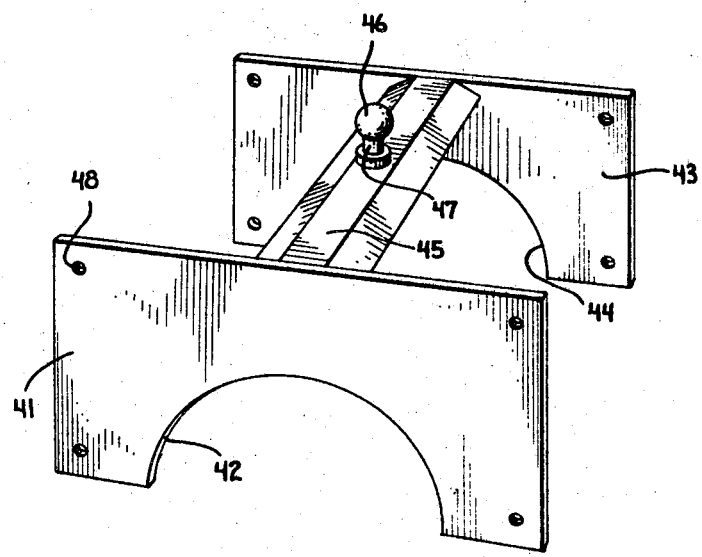
FIG. 8 is an enlarged perspective view of the male coupler of the embodiment shown in FIG. 3.

FIGS. 3 and 8 illustrate still another embodiment of the present invention wherein the first element 40 comprises a first rectangular plate 41 having a substantially C-shaped cut-out area 42 for fitting over a wheel well 29 of pick-up truck 12 and a second rectangular plate 43 having a corresponding substantially C-shaped cut-out area 44. Plates 41 and 43 are maintained in a spaced relation by spacer bar 45 which has a first end secured to plate 41 and a second end secured to plate 43. The ball 46 is coupled to bow 45 by stem 47.

Each plate has a plurality of apertures 48 which correspond to apertures in the sidewalls 35 of the vehicle bed. The plates are secured to the vehicle bed sidewalls by bolts or other suitable means. As shown in FIG. 7, the plates fit over the wheel wells and are flush with the vehicle bed sidewalls.

Thus the present invention provides a coupling unit for hitching a two-wheel trailer to a relatively light vehicle such as a pick-up truck. The coupling element adapted for use with the vehicle generally includes a base for securing the element to the vehicle bed adjacent the rear axle of the vehicle and means for supporting and centrally locating the ball or ball socket of a ball socket hitch.

By drilling the apropriate apertures, a truck or automobile is adapted for use with the present invention. Thus vehicles may be adapted for hauling relatively heavy trailers without substantially altering the vehicle or permanently impairing its normal use.

While the invention has been disclosesd and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A coupling unit for hitching a two-wheel trailer to a power vehicle having a load carrying bed, said coupling unit comprising a first coupling element adapted to be secured to a vehicle frame, said first coupling element secured to said vehicle bed above the rear axle of said vehicle, a second coupling element adapted to be secured to said trailer, said first coupling element including a base means coupled to said vehicle bed above the rear axle of said vehicle, said vehicle being a pickup truck, and said base means including a pair of parallel bars spaced to straddle the wheel wells on the bed of said truck; a first substantially C-shaped spacer member adapted to fit over one of said wheel wells one end of said first spacer member coupled to one of said bars, the other end of said first spacer member coupled to the other of said bars; a second substantially C-shaped spacer member adapted to fit over a second wheel well, one end of said second spacer member coupled to one of said bars, the other end of said second spacer member coupled to the other of said bars; each of said bars having a plurality of spaced apertures aligned with a plurality of spaced apertures in the bed of said truck for receiving securing means therethrough; a rod secured to said first spacer member adjacent a first end of said rod and secured to said second spacer member adjacent a second end of said rod so as to be spaced midway between said bars, each end of said rod extending beyond said support member so as to rest on a top of a side wall of said truck bed, means adjacent each end of said rod for securing said rod to said side walls; said rod carrying a ball.

2. A coupling unit for hitching a two-wheel trailer to a power vehicle having a load carrying bed, said coupling unit comprising a first coupling element adapted to be secured to a vehicle frame, said first coupling element secured to said vehicle bed above the rear axle of said vehicle, a second coupling element adapted to be secured to said trailer, said first coupling element including a base means coupled to said vehicle bed above the rear axle of said vehicle, said base means including a first substantially rectangular plate having a substantially C-shaped cut-out area for fitting said plate over a wheel well of said vehicle bed; a second substantially rectangular plate having a substantially C-shaped cut-out area for fitting said plate over a second wheel well; each of said plates having a plurality of spaced apertures for receiving means for securing each said plates to a side wall of said vehicle bed; a spacer bar maintaining said plates in a spaced relation so that each of said plates abuts against a one of said side walls, said spacer bar carrying a ball.

3. A coupling unit for hitching a two-wheel trailer to a pickup truck having a load carrying bed, said coupling unit comprising a pair of parallel bars spaced to straddle the wheel wells on the bed of said truck, a first substantially C-shaped spacer member adapted to fit over one of said wheel wells, a second substantially C-shaped spacer member adapted to fit over the other of said wheel wells, one end of each spacer member coupled to one of said pair of bars, the other end of each spacer coupled to the other of said pair of bars, a rod secured adjacent its ends to each of said spacer members so as to be spaced substantially midway between said bars, each end of said rod extending beyond said spacer members so as to rest on the top of a side wall of said truck and having affixed thereto means for securing said rod to said side walls, and a ball affixed to said rod.

References Cited

UNITED STATES PATENTS

| 2,416,921 | 3/1947 | Hingley | 280—402 |
| 2,436,485 | 2/1948 | Roxy | 280—402 |
| 2,925,286 | 2/1960 | Hodges et al. | 280—423 X |
| 3,164,398 | 1/1965 | Lugash | 280—423 |
| 3,166,141 | 1/1965 | Shields et al. | |

FOREIGN PATENTS 989,175  4/1965  Great Britain.

LEO FRIAGLIA, *Primary Examiner.*